US009087404B2

United States Patent
Hansis et al.

(10) Patent No.: US 9,087,404 B2
(45) Date of Patent: Jul. 21, 2015

(54) RECONSTRUCTION FOR CONE-BEAM COMPUTED TOMOGRAPHY IMAGING WITH OFF-CENTER FLAT PANEL DETECTOR

(75) Inventors: Eberhard S. Hansis, Menlo Park, CA (US); Dirk Schaefer, Hamburg (DE); Michael Grass, Buchholz in der Norheide (DE)

(73) Assignee: Koninklijke Philips N.V., Eindhoven (NL)

( * ) Notice: Subject to any disclaimer, the term of this patent is extended or adjusted under 35 U.S.C. 154(b) by 322 days.

(21) Appl. No.: 13/697,445

(22) PCT Filed: Apr. 25, 2011

(86) PCT No.: PCT/IB2011/051793
§ 371 (c)(1),
(2), (4) Date: Nov. 12, 2012

(87) PCT Pub. No.: WO2011/148277
PCT Pub. Date: Dec. 1, 2011

(65) Prior Publication Data
US 2013/0077847 A1   Mar. 28, 2013

Related U.S. Application Data

(60) Provisional application No. 61/348,757, filed on May 27, 2010.

(51) Int. Cl.
*G01N 23/04* (2006.01)
*G06T 1/00* (2006.01)
*G06T 11/00* (2006.01)

(52) U.S. Cl.
CPC ............. *G06T 11/008* (2013.01); *G06T 11/006* (2013.01); *G06T 2211/432* (2013.01)

(58) Field of Classification Search
USPC ........ 378/4, 8, 15, 20, 62, 210, 901; 382/131, 382/132, 325
See application file for complete search history.

(56) References Cited

U.S. PATENT DOCUMENTS 5,909,476 A   6/1999   Cheng et al.
6,490,333 B1 *   12/2002   Hsieh ............................... 378/4
(Continued)

FOREIGN PATENT DOCUMENTS

| CN | 101135655 A | 3/2008 |
| JP | 2007151849 A | 6/2007 |
| WO | 2009060344 A2 | 5/2009 |

OTHER PUBLICATIONS

Cho, P. S., et al.; Cone-Beam CT from Width-Truncated Projections; 1996; Computerized Medical Imaging and Graphics; 20(1)49-57.
(Continued)

*Primary Examiner* — Bernard E Souw (57) ABSTRACT

Computed tomography (CT) reconstruction includes reconstructing an axially extended reconstructed image from a measured cone beam x-ray projection data set (Pm), optionally having an off-center geometry. The reconstructing is performed for an extended volume (eFOV) comprising a reconstructable volume (rFOV) of the measured cone beam x ray data set that is extended along the axial direction. The projection data set may be weighted in the volume domain. Iterative reconstruction may be used, including initializing a constant volume and performing one or more iterations employing a first iterative update followed by one or more iterations employing a second, different iterative update. Alternatively, backprojection filtration (BPF) reconstruction may be used, including transforming the projection data set to a new geometry including finite differences between neighboring projection views and performing BPF using Hilbert filtering along a plurality of different directions and averaging the resultant reconstructed images to generate the final reconstructed image.

22 Claims, 6 Drawing Sheets (56) References Cited

U.S. PATENT DOCUMENTS

| | | | |
|---|---|---|---|
| 6,862,335 B2 | 3/2005 | Basu et al. | |
| 7,050,527 B2 | 5/2006 | Hsieh | |
| 7,372,937 B2* | 5/2008 | Wang et al. | 378/16 |
| 7,409,033 B2 | 8/2008 | Zhu et al. | |
| 7,822,171 B2* | 10/2010 | Bontus et al. | 378/11 |
| 8,373,652 B2* | 2/2013 | Masuzawa | 345/156 |
| 8,718,343 B2* | 5/2014 | Bruder et al. | 382/131 |
| 2003/0161444 A1* | 8/2003 | Katsevich | 378/210 |
| 2004/0086074 A1* | 5/2004 | Taguchi | 378/4 |
| 2005/0152494 A1 | 7/2005 | Katsevich | |
| 2006/0262893 A1 | 11/2006 | Tang et al. | |
| 2009/0016592 A1* | 1/2009 | Hoppe et al. | 382/131 |
| 2010/0119103 A1* | 5/2010 | Ewert et al. | 382/100 |
| 2011/0091085 A1* | 4/2011 | Dennerlein et al. | 382/131 |
| 2012/0014582 A1 | 1/2012 | Schaefer et al. | |
| 2012/0121062 A1* | 5/2012 | Sowards-Emmerd et al. | 378/4 |

OTHER PUBLICATIONS

Dennerlein, F., et al.; A Factorization Approach for Cone-Beam Reconstruction on a Circular Short-Scan; 2008; IEEE-TMI; 27(7)887-896.

Katsevich, A.; Analysis of an exact inversion algorithm for spiral cone-beam CT; 2002; Phys. Med. Biol.; 47:2583-2597.

Kunze, H., et al.; Cone beam reconstruction with displaced flat panel detector; 2009; Proc. of 10th Int'l. Mtg. on Fully 3D Image Reconstruction; pp. 138-141.

Lauritsch, G., et al.; Head Phantom; http://www.imp.uni-erlangen.de/forbild/deutsch/results/head/head.html accessed Nov. 6, 2012.

Li, L., et al.; A cone-beam tomography system with a reduced size planar detector: A backprojection-filtration reconstruction algorithm as well as numerical and practical experiments; 2007; Applied Radiation and Isotopes; 65:1041-1047.

Li, L., et al.; 3D Region-of-Interest (ROI) Reconstruction from Truncated Data in Circular Cone-beam CT; 2008; IEEE Nuclear Science Symposium Record; pp. 5143-5146.

Pack, J. D., et al.; Cone-Beam Reconstruction Using the Backprojection of Locally Filtered Projections; 2005; IEEE Trans. on Medical Imaging; 24(1)70-85.

Schaefer, D., et al.; Cone-beam filtered back-projection for circular X-ray tomography with off-center detector; 2009; 10th Int'l. Mtg. on Fully 3D Image Reconstruction in Radiology and Nuclear Medicine; pp. 86-89.

You, J., et al.; Explicit finite inverse Hilbert transforms; 2006; Inverse Problems; 22:L7-L10.

Zamyatin, A. A., et al.; Helical cone beam CT with an asymmetrical detector; 2005; Med. Phys.; 32(10)3117-3122.

* cited by examiner

RECONSTRUCTION FOR CONE-BEAM COMPUTED TOMOGRAPHY IMAGING WITH OFF-CENTER FLAT PANEL DETECTOR

CROSS REFERENCE TO RELATED APPLICATIONS

This application is a national filing of PCT application Serial No. PCT/IB2011/051793, filed Apr. 25, 2011, published as WO2011/148277 A2 on Dec. 1, 2011, which claims the benefit of U.S. provisional application Ser. No. 61/348,757 filed May 27, 2010, which is incorporated herein by reference.

The following relates to the computed tomography (CT) imaging arts, image reconstruction arts, and related arts.

To maximize projection volume in transmission computed tomography (CT) imaging, it is known to employ an x-ray source emitting a cone beam of x-rays. Cone beam reconstruction is a challenging problem due to the complex conical geometry. Approaches including filtered backprojection (FBP) and iterative reconstruction have been employed for cone-beam CT image reconstruction.

In conventional cone beam CT geometries, a two-dimensional detector is arranged symmetrically respective to the cone beam. Accordingly, although the cone beam introduces problematic geometrical complexity, this complexity at least has substantial symmetries which the image reconstruction algorithm can utilize.

In some cone beam CT imaging systems, the detector is arranged "off-center", that is, the detector is positioned asymmetrically in the fan direction with respect to the central ray of the cone beam passing through the isocenter of the CT imaging system. The cone beam x-ray source is optionally modified so that the cone beam fills the off-center detector. The effect of this off-center cone beam geometry is to provide an effective projection fan, when gantry rotation is considered, that is close to twice as large as would be obtained for the cone beam x-ray source-detector assembly in the conventional symmetric geometry. The two-dimensional detector can be flat, which simplifies construction.

The off-center cone beam geometry violates some conditions that reconstruction algorithms developed for conventional symmetric cone beam geometries have previously utilized, for example, in truncating the X-ray projections near the object center. Nonetheless, techniques such as iterative reconstruction, FBP, or so forth that have been utilized for symmetric cone beam geometries have also typically been applied to off-center cone beam geometry reconstruction tasks. This can lead to artifacts or other deficiencies in the reconstructed images.

The following provides new and improved apparatuses and methods as disclosed herein.

In accordance with one disclosed aspect, a computed tomography (CT) reconstruction method comprises: reconstructing an axially extended reconstructed image from a measured cone beam x-ray projection data set acquired during rotation of an x-ray source in a rotation plane around an axial axis, the reconstructing being performed for an extended volume and comprising a reconstructable volume of the measured cone beam x-ray data set that is extended along the axial direction; and generating a reconstructed image by selected axial truncation of the axially extended reconstructed image.

In accordance with another disclosed aspect, a CT reconstruction method comprises generating a reconstructed image by reconstructing a measured cone beam x-ray projection data set acquired during rotation of an x-ray source in a rotation plane around an axial axis, the reconstructing including: (0) initializing an initial reconstructed image; (1) performing iterative reconstruction including one or more iterations employing one type of iterative update wherein the first iteration operates on the initial reconstructed image and wherein the iterative reconstruction (1) generates a reconstructed image estimate; and (2) performing iterative reconstruction including one or more iterations employing a different type of iterative update wherein the first iteration operates on the reconstructed image estimate.

In accordance with another disclosed aspect, a CT reconstruction method comprises generating a reconstructed image by reconstructing a measured cone beam x-ray projection data set acquired during rotation of an x-ray source in a rotation plane around an axial axis, the reconstructing including: transforming the measured cone beam x-ray projection data set to a new geometry including finite differences between projections of neighboring projection views; and performing backprojection filtration (BPF) reconstruction on the measured cone beam x ray projection data set transformed to the new geometry including the finite differences between projections of neighboring projection views. The performing of BPF reconstruction may include: performing backprojection filtration using Hilbert filtering along a plurality of different directions to generate a corresponding plurality of intermediate reconstructed images; and averaging the plurality of intermediate reconstructed images to generate the reconstructed image.

In accordance with another disclosed aspect, a processor is disclosed, which is configured to perform a CT reconstruction method as set forth in any one of the three immediately preceding paragraphs. In accordance with another disclosed aspect, a storage medium is disclosed, which stores instructions executable on a digital processor to perform a CT reconstruction method as set forth in any one of three immediately preceding paragraphs.

One advantage resides in reconstructing a cone beam x-ray projection data set to generate a reconstructed image with one or more improvements such as reduced or eliminated artifacts, better uniformity, or reduced noise.

Another advantage resides in reconstructing a cone beam x-ray projection data set having an off-center geometry to generate a reconstructed image with one or more improvements such as reduced or eliminated artifacts, better uniformity, or reduced noise.

Further advantages will be apparent to those of ordinary skill in the art upon reading and understanding the following detailed description.

Figure 1:
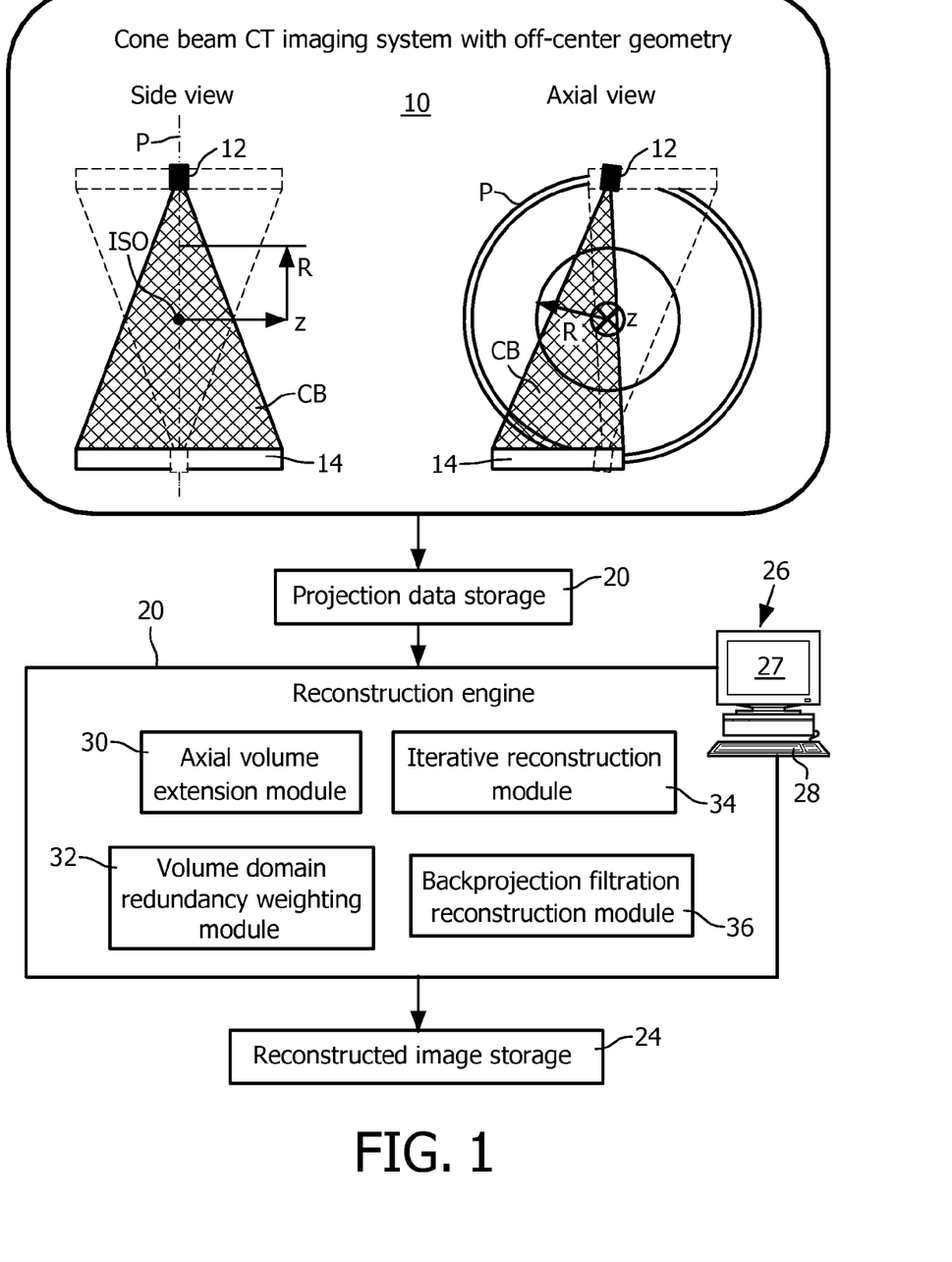
FIG. 1 diagrammatically shows an illustrative computed tomography (CT) imaging system including a reconstruction engine as set forth herein, in which the CT imaging system has an illustrative off-center geometry.

With reference to FIG. 1, a computed tomography (CT) imaging system 10 is diagrammatically depicted in FIG. 1 by showing the operative components in diagrammatic side and axial views. The illustrated CT imaging system 10 includes an x-ray source 12 and a two-dimensional detector 14 arranged in an off-center geometry as best seen in the axial view. The off-center geometry is described with respect to the following references: an axial axis z around which the x-ray source 12 and detector 14 rotate; a rotation plane P in which the x-ray source 12 and detector 14 rotate; an isocenter ISO at which the axial axis z intersects the rotation plane P (labelled only in the side view; in the axial view the labelled axis z appears at a point which inherently includes the isocenter); and a radius R from the axial axis z. The rotation plane P is denoted in the axial view by a circle which the rotating x-ray source 12 and detector 14 follow.

In the illustrative embodiment the rotation plane P is oriented perpendicular to (that is, transverse to) the axial axis z; however, a tilted gantry geometry is also contemplated, in which the rotation plane is tilted by a few degrees (e.g., 5°, or 10°, or so forth) respective to the axial axis.

The radius R denotes the largest radial distance from the axial axis z that any x-ray absorbing structure is expected. Said another way, x-rays emitted by the x-ray source 12 and measured by the detector 14 are expected to experience absorption (if at all) only within a volume contained by a cylinder having its axis coinciding with the axial axis z and having radius R. In some embodiments, the radius R is enforced by a physical "bore" of the CT imaging system 10, in which the bore is a cylindrical opening or passage of inner radius R that physically constrains an imaging subject to stay within the radius R.

The x-ray source 12 and detector 14 rotate around the axial axis z (and more particularly around the isocenter ISO) while lying in the rotation plane P. The x-ray source 12 and detector 14 remain arranged at opposing positions during this rotation, such that an x-ray cone beam CB generated by the x-ray source 12 (and indicated in FIG. 1 by crosshatching) is detected by the two-dimensional detector 14 at any point in the rotation. Diagrammatic FIG. 1 shows the point in the rotation at which the x-ray source 12 is located at its "highest" point in the rotation and the detector 14 is located at its "lowest" point in the rotation. To further assist in visualizing the rotation, the positions of the x-ray source and detector at their positions after 180° rotation are shown in FIG. 1 in phantom without component labelling. In the phantom view, the detector is located at its "highest" point in the rotation and the x-ray source is at its "lowest" point in the rotation.

As best seen in the axial view of the diagrammatic representation of the CT imaging system 10 of FIG. 1, the off-center geometry entails the two-dimensional detector 14 being positioned asymmetrically in the rotational (i.e., fan) direction with respect to the central x-ray passing through the isocenter ISO. The x-ray source 12 is optionally modified so that it more effectively irradiates the area of the two-dimensional detector 14 with little or no "spillage" of x-rays outside of the area of the detector 14. The illustrative detector 14 is a flat panel detector; however, it is also contemplated to employ a source-focused detector geometry, an isocenter-focused detector geometry, or another detector geometry.

As is known in the art, the off-center geometry has advantages including providing (when the rotation and the complementary nature of 180° opposite projections is taken into account) a relatively larger effective beam width in the rotational or fan direction for a given detector size in the rotational or fan direction. By way of illustrative example, the off-center geometry is well-suited for use in a hybrid imaging system such as a gamma camera having integral transmission CT imaging capability provided by a CT x-ray source and detector having the illustrative off-center geometry. Such a system is also known as a single photon emission computed tomography (SPECT)/CT system.

The disclosed reconstruction techniques are suitably applied to cone beam CT imaging data acquired using an off-center geometry (or, said another way, a measured cone beam CT imaging data set having an off-center geometry) such as is illustrated in FIG. 1. However, the disclosed reconstruction techniques are also generally suitable for use in reconstructing CT imaging data acquired by a cone beam CT imaging system having a symmetric geometry in which the two-dimensional detector is positioned symmetrically in the rotational (i.e., fan) direction with respect to the central x-ray passing through the isocenter. Furthermore, the disclosed reconstruction techniques are also generally suitable for use in reconstructing CT imaging data acquired by a combined positron emission tomography/CT scanner (PET/CT scanner) in which the CT component employs an off-center geometry or a symmetric geometry.

With continuing reference to FIG. 1, the CT imaging system 10 acquires (or measures) cone beam x-ray projection data acquired during one or more 360° rotations of an x-ray source in a rotation plane around an axial axis. A measured cone beam x-ray projection data set spanning (at least) 360° rotation provides sufficient data to reconstruct an image within a reconstructable volume, and is stored in a projection data storage 20 (which may, by way of example, include one or more of an electronic storage medium, a magnetic storage medium, an optical storage medium, or so forth). The measured cone beam x-ray projection data set is reconstructed by a reconstruction engine 22 to generate a reconstructed image that is stored in a reconstructed image storage 24. In the illustrative embodiment the reconstruction engine 22 is embodied by a suitably programmed computer 26 that includes a digital processor (not shown); more generally, the reconstruction engine 22 may be embodied by a digital processing device such as a computer, network server, dedicated digital processing device, or so forth that includes a digital processor suitably configured to perform image reconstruction by software or firmware stored in a read only memory (ROM), programmable read only memory (PROM), or so forth. The "processor" or "digital processor" may include multiple cores (e.g., a dual-core processor, quad-core processor, or so forth) and/or may comprise a parallel arrangement of processors (as in a supercomputer, for example). Moreover, it is contemplated for the reconstruction engine 22 to include application-specific integrated circuitry (ASIC) which optionally may include analog processing circuitry designed to implement certain reconstruction processing operations.

The reconstructed image is stored in the storage 24, and is suitably used in various ways, such as: being displayed on a display 27 of the computer 26 (or on some other display device), being communicated via the Internet or another digital data network to a remote location for display or other usage; being printed by a printer; or so forth. The illustrative computer 26 also includes a keyboard 28 (or other user input device) via which a user can identify a measured cone beam x-ray projection data set for reconstruction, input reconstruction parameters, or otherwise interact with the reconstruction engine 22. The interfacing components 27, 28 are optionally also used by a user to control the cone-beam CT imaging system 10, for example to set up and execute an axial data acquisition. Alternatively, a different user interfacing device (not shown) may be provided.

The reconstruction engine 22 can also be physically embodied as a storage medium that stores instructions (for example, software or firmware or a combination thereof) that when executed by a digital processor (such as the processor of the illustrative computer 26) performs image reconstruction conforming with reconstruction techniques disclosed herein. The storage medium may, by way of illustrative example, include one or more of the following: random access memory (RAM), read-only memory (ROM), programmable read-only memory (PROM), FLASH memory, or another electronic storage medium; a hard disk or other magnetic storage medium; an optical disk or other optical storage medium; or so forth.

As is known in the art, accurate reconstruction of a measured cone-beam x-ray projection data set is difficult due to the complex cone beam geometry, and in reconstruction techniques applied heretofore various factors can lead to image degradation. The off-center geometry of the x-ray projection data sets generated by the cone-beam CT imaging system 10 of FIG. 1 with its off-center geometry introduces further geometry complexity that heretofore has led to additional image degradation. Such image degradation may include, by way of example image artifacts and/or nonuniformity across the image. The reconstruction engine 22 includes various improvements and aspects as disclosed herein that reduce or eliminate such degradation. As disclosed herein, the various improvements and aspects may be used in various combinations to provide improved reconstructed images.

With continuing reference to FIG. 1, the reconstruction engine 22 reconstructs a reconstructable volume, which is the volume within which each voxel is probed by projections of the measured cone-beam x-ray projection data set over a full 180° angular span. Some voxels near to but outside of the reconstructable volume are also probed by some x-ray projections, but not by a full 180° span of projections. As disclosed herein and described in greater detail with reference to FIGS. 2-4, the reconstruction engine 22 optionally includes an axial volume extension module 30 that extends the volume that is reconstructed, and mathematically augments or extends the measured cone-beam x-ray projection data set by extrapolating or extending additional projection data comprising additional projections that intersect the total volume within the radial distance R of the axial axis z in which projections of the measured cone beam x-ray data set may have undergone absorption. By reconstructing this augmented or extended data set for the axially extended volume, the reconstruction within the reconstructable volume is made more accurate, thus reducing or eliminating image degradation due to absorption of measured projections outside of the reconstructable volume.

With continuing reference to FIG. 1, the reconstruction engine 22 employs redundancy weighting of projections. Such weighting is known to improve the reconstructed image quality, for example by allowing for weighted combination of complementary opposing projections that are 180° apart. However, it is recognized herein that such weighting is sensitive to small errors in the acquisition geometry, since even small errors can result in nonuniform weight combinations and consequent image degradation. Such effects are problematic in an off-center geometry (such as that of the CT imaging system 10 of FIG. 1) which relies on combining complementary projections to compensate for the "missing half" of the off-set detector 14. As disclosed herein and described in greater detail with reference to FIG. 5, the reconstruction engine 22 optionally includes a volume domain redundancy weighting module 32 that performs the weighting in the volume domain, on a per-voxel basis.

With continuing reference to FIG. 1, the reconstruction engine 22 includes two reconstruction modules: (1) an iterative reconstruction module 34; and (2) a backprojection filtration (BPF) module 36. The reconstruction engine 22 can perform the image reconstruction using either the iterative reconstruction module 34, or the BPF module 36. In various embodiments, the reconstruction engine 22 may include only the iterative reconstruction module 34; or may include only the BPF module 36; or may include both the iterative reconstruction module 34 and the BPF module 36. In the latter case, the user is suitably provided with a selection option via the user interfacing components 27, 28 by which the user selects to perform reconstruction of a measured cone beam x-ray projection data set using either the iterative reconstruction algorithm (implemented by the module 34) or the non-iterative BPF reconstruction algorithm (implemented by the module 36).

Iterative reconstruction convergence is known to be sensitive to the closeness of the initial image to the final image. Heretofore it is known to employ a non-iterative reconstruction technique such as filtered backprojection to generate a "close" initial image that is then improved upon by the iterative reconstruction. However, it is recognized herein that filtered backprojection can introduce certain artifacts that are not effectively removed by the subsequent iterative reconstruction. To overcome this problem, the disclosed iterative reconstruction module 34, which is described in greater detail with reference to FIG. 6, initializes an initial reconstructed image in a way that does not introduce the types of artifacts known to be generated by filtered backprojection. By way of example, the iterative reconstruction module 34 suitably initializes all voxels of the initial reconstructed image to a constant value. The initialization is followed by one or more iterations of one, preferably a fast-converging iterative update, such as an algebraic iterative update. This, in effect, produces the "initial image" that is close to the final image but which advantageously does not include the types of image artifacts normally associated with filtered backprojection. Finally, the one or more initial iterations are followed by one or more iterations of a another, possibly slower-converging (but with possibly better reconstruction properties, such as generating reconstructions with lower noise) iterative update such as a maximum likelihood iterative update.

The BPF module 36 performs backprojection filtration reconstruction, which is a non-iterative reconstruction technique. However, the BPF module 36 implements certain improvements, such as transforming the measured cone beam x-ray projection data set to a new geometry including finite differences between projections of neighboring projection views and performing the BPF reconstruction on the transformed data set. Additionally or alternatively, the BPF module 36 performs the BPF using Hilbert filtering along a plurality of different directions to generate a corresponding plurality of intermediate reconstructed images and averages the plurality of intermediate reconstructed images to generate the final reconstructed image. These improvements disclosed herein, applied alone or in combination, reduce the types of image artifacts heretofore associated with non-iterative cone-beam backprojection reconstruction techniques through the use of interpolation and/or averaging of the Hilbert filtering.

Figure 2:
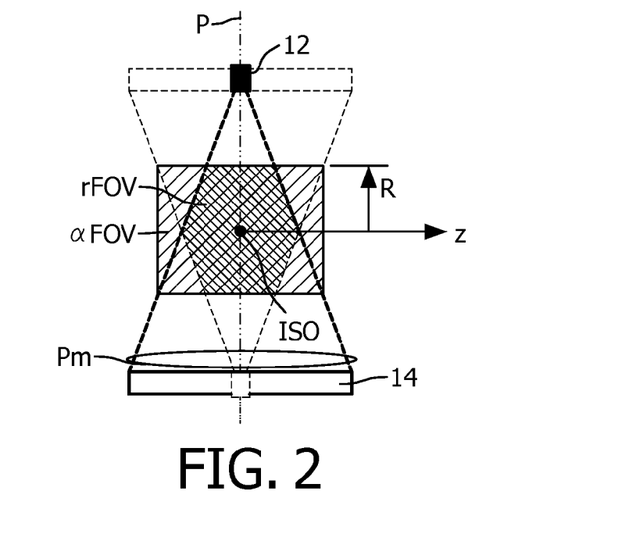
FIGS. 2-4 diagrammatically show operation of the axial volume extension module of FIG. 1.
Figure 3:
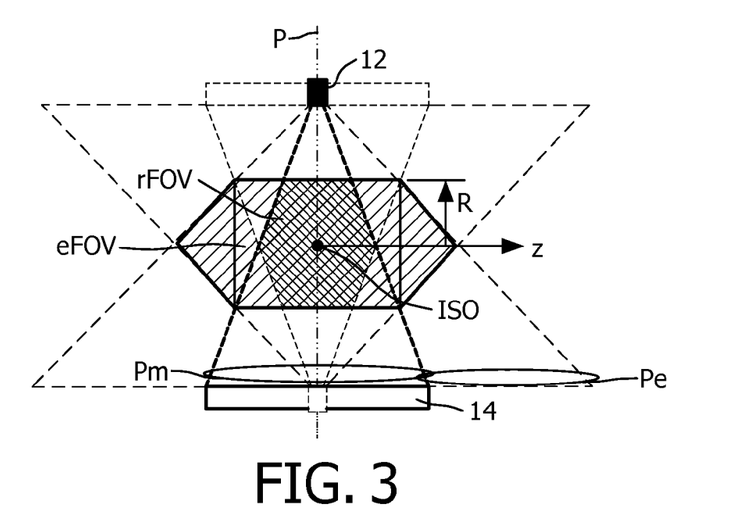
Figure 4:
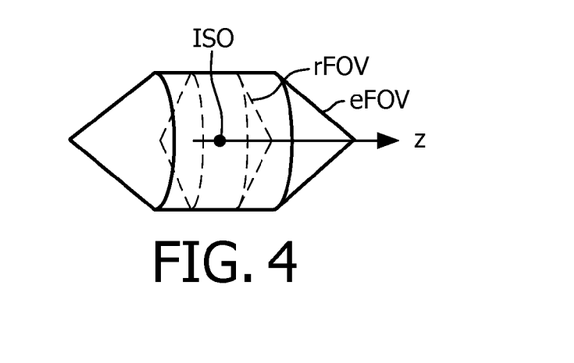

With continuing reference to FIG. 1 and with further reference to FIGS. 2-4, operation of the optional axial volume extension module 30 is described in additional detail. FIGS. 2 and 3 depict a side view of the CT imaging system 10 of FIG.

1. FIGS. 2-4 use the same visualizations and labeling as previously described in reference to the side view shown in FIG. 1. As additionally seen in FIG. 2, the x-ray source 12 and detector 14 acquire a measured cone beam x-ray projection data set Pm that is acquired during rotation of the x-ray source 12 in the rotation plane P around an axial axis z. In FIGS. 2 and 3, a measured cone beam x-ray projection data set Pm is diagrammatically depicted by showing two source positions: one in which the x-ray source 12 at its uppermost position; and the other in which the x-ray source is at the opposing (and complementary) 180° angular position shown in phantom.

A reconstructable volume or field of view rFOV is indicated in FIGS. 2-4. The reconstructable volume or field of view rFOV is the volume within which each voxel is probed by projections of the measured cone-beam x-ray projection data set Pm over a at least 180° (plus fan angle) angular span. FIG. 4 depicts a perspective view of the reconstructable volume rFOV, showing that it is a cylinder with symmetrically positioned conical portions having tips lying on the axial axis z. These conical portions result because the expanding cone beam samples further out from the isocenter ISO for voxels closer to the axial axis z.

Some voxels near to but outside of the reconstructable volume are also probed by some x-ray projections, but not by a full 180° span of projections. In FIG. 2 this partially probed volume is labeled the "absorption" volume or field of view αFOV, and denotes the total volume within the radial distance R of the axial axis z in which the measured cone beam x-ray data set Pm may have undergone absorption. Although not readily seen in FIG. 2, the absorption field of view has inward conical depressions whose tips lie on the axial axis z. If the images subject extends axially beyond the reconstructable volume rFOV, then the reconstruction is axially truncated to lie within the reconstructable volume rFOV. The reconstruction processing aims at matching the measured absorption as represented by the with the measured cone beam x-ray data set Pm with simulated absorption along each ray traversing the reconstructable volume rFOV. However, the measured cone beam x-ray data set Pm includes absorption occurring in the larger absorption volume αFOV that is not included in the reconstructable volume rFOV. This absorption occurring in the absorption volume αFOV but outside of the reconstructable volume rFOV cannot be accounted for by reconstructing inside the reconstructable volume rFOV only.

To account for this absorption occurring outside the reconstructable volume rFOV, it is disclosed herein to extend the reconstructed volume rFOV along the axial direction to form an extended volume or field of view eFOV (shown in side view in FIG. 3 and in perspective view in FIG. 4) that is large enough that all measured rays of all projections of the measured cone beam x-ray data set Pm run inside eFOV. Furthermore, the measured cone beam x-ray data set Pm is extended along the axial direction, for example by repetition of the first/last detector rows, to form an additional projection data set (Pe) as shown in FIG. 3. By doing this, an estimated reconstruction can be performed in the extended volume eFOV, outside the reconstructable volume rFOV, and all measured rays are covered completely by the reconstruction. The final reconstructed image is then obtained by selected axial truncation of the axially extended reconstructed image, for example by removing portions of the reconstructed image that lie inside the extended volume eFOV but outside the reconstructable volume rFOV so as to retain after truncation only the portion of the reconstructed image coinciding with the reconstructable volume rFOV.

With continuing reference to FIGS. 2-4, the operation of the axial volume extension module 30 of FIG. 1 is further described. An axially extended reconstructed image is reconstructed from the measured cone beam x ray projection data set Pm acquired during rotation of the x-ray source 12 in the rotation plane P around the axial axis z. The reconstructing is performed for the extended volume eFOV which comprises the reconstructable volume rFOV of the measured cone beam x-ray data set Pm extended along the axial direction z. The reconstructable volume rFOV is centered on the axial axis z and bounded by the radial distance R from the axial axis (since the radial distance R defines the furthest possible radial extent that can be occupied by x-ray absorbing material). Similarly, the extended volume eFOV is centered on the axial axis z and also is bounded by the radial distance R from the axial axis. The extended volume eFOV includes at least the total volume αFOV within the radial distance R of the axial axis z in which the cone beam x-ray data set Pm may have undergone absorption. Optionally, one can choose a smaller (or larger) and differently shaped volume than the described reconstruction volume if one knows that the chosen volume is large enough to encompass the imaging subject. For example, one can choose a smaller cubic volume that encompasses the imaging subject and that is not centered on the rotation axis and has different bounds than R.

The axially extended reconstructed image is reconstructed from an extended projection data set that includes the measured cone beam x-ray projection data set Pm and the additional projection data set Pe comprising all projections that are not in the measured cone beam x-ray projection data set Pm and that intersect the total volume αFOV within the radial distance R of the axial axis z in which the measured cone beam x-ray data set Pm may have undergone absorption. The extended volume eFOV for the reconstruction of the extended data set Pm, Pe suitably comprises the reconstructable volume of the extended projection data set.

Said another way, the extended volume eFOV suitably comprises the reconstructable volume of an extended projection data set Pm, Pe that includes all projections intersecting a total volume αFOV within the radial distance R of the axial axis z in which the measured cone beam x ray data set Pm may have undergone absorption. The extended projection data set Pm, Pe is suitably formed by extending the measured cone beam x ray data set Pm, for example by repeating values of projections of the measured cone beam x-ray data set Pm having largest angle respective to the rotation plane P in order to form the additional projection data set Pe.

In the illustrated embodiment of FIGS. 1-4, the measured cone beam x-ray data set Pm comprises an off-center geometry measured cone beam x-ray data set acquired by the cone beam CT imaging system 10 having an off-center geometry. However, it will be observed, especially with reference to FIGS. 2-4, that the axial extension is a function of axial position and is not dependent upon the off-center geometry. Accordingly, the axial volume extension module 30 of FIG. 1 operating as described herein with reference to FIGS. 2-4 is also suitable for use in reconstructing CT imaging data acquired by a cone beam CT imaging system having a symmetric geometry in which the two-dimensional detector is positioned symmetrically in the rotational (i.e., fan) direction with respect to the central x-ray passing through the isocenter.

Figure 5:
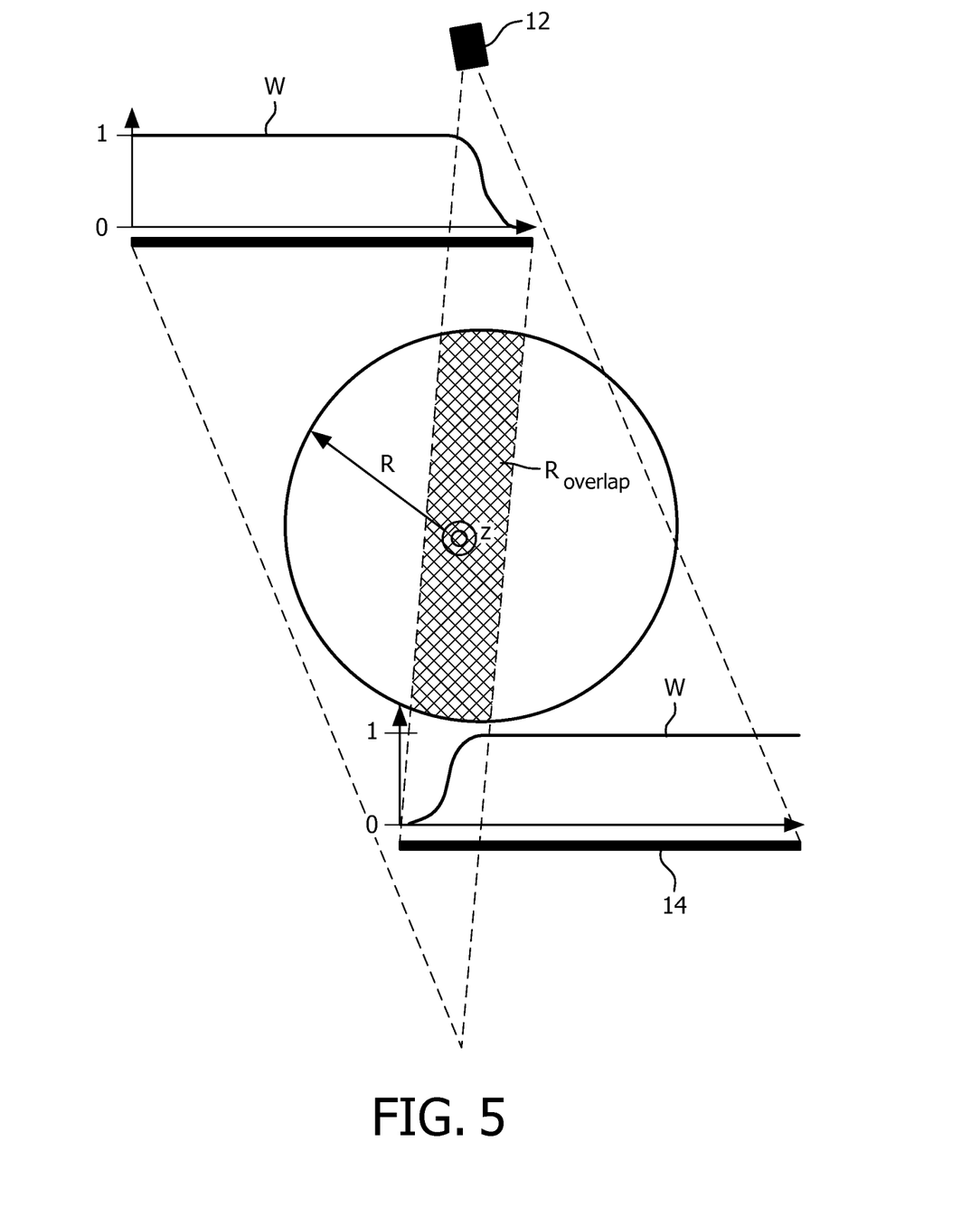
FIG. 5 diagrammatically shows operation of the volume domain redundancy weighting module of FIG. 1.

With continuing reference to FIG. 1 and with further reference to FIG. 5, operation of the optional volume domain redundancy weighting module 32 is described in additional detail. FIG. 5 depict an axial view of the CT imaging system 10 as in FIG. 1, except that the view looking in the −z direction (that is, the vector z is out of the page in FIG. 5, whereas it is into the page in FIG. 1). In the off-center geometry, each cone-beam projection covers slightly more than one-half of the field of view, typically with a small central overlap region $R_{overlap}$ that is also imaged by the complementary cone-beam projection rotated 180° away. This varying volume coverage is preferably taken into account in the reconstruction. Known Feldkamp-type algorithms apply a weighting to the projection data such that a backprojection of all weighting functions would result in a uniform image.

It is recognized herein, however, that this weighting function is sensitive to small errors in the acquisition geometry. Slightly shifting the weighting function with respect to the correct position leads to non-uniform weighting and artifacts in the reconstruction. In the case of an off-center geometry employing a reconstruction which relies on combining complementary projections to compensate for the "missing half" of the off-set detector 14, reconstructing from "half" projections of the off-center geometry without introducing a suitable weighting function can lead to artifacts in iterative reconstruction caused by strong gradients in backprojected image corrections near the truncation.

It is disclosed herein to employ the volume domain redundancy weighting module 32 to perform redundancy weighting in the volume domain. Performing the weighting in the volume domain ensures uniform coverage or weighting over the volume, and avoids strong gradients in the image corrections. To this end, pairs of opposite projections are backprojected simultaneously. The contributions of the two projections are weighted by a suitable weighting function W that varies in the rotational or fan direction across the detector 14 as shown in FIG. 5. The total correction to the reconstructed volume is normalized to the sum of weights, keeping the total correction weight constant over the whole volume, irrespective of errors in the placement of the weighting function. Said another way, the measured cone beam x-ray projection data set Pm is weighted in the volume domain with normalization of the weighting such that the total correction weight is constant over the extended volume.

The disclosed volume domain redundancy weighting is especially useful in the case of off-center geometries, but is also suitably applied in reconstructing CT imaging data acquired by a cone beam CT imaging system having a symmetric geometry in which the two-dimensional detector is positioned symmetrically in the rotational (i.e., fan) direction with respect to the central x-ray passing through the isocenter.

Figure 6:
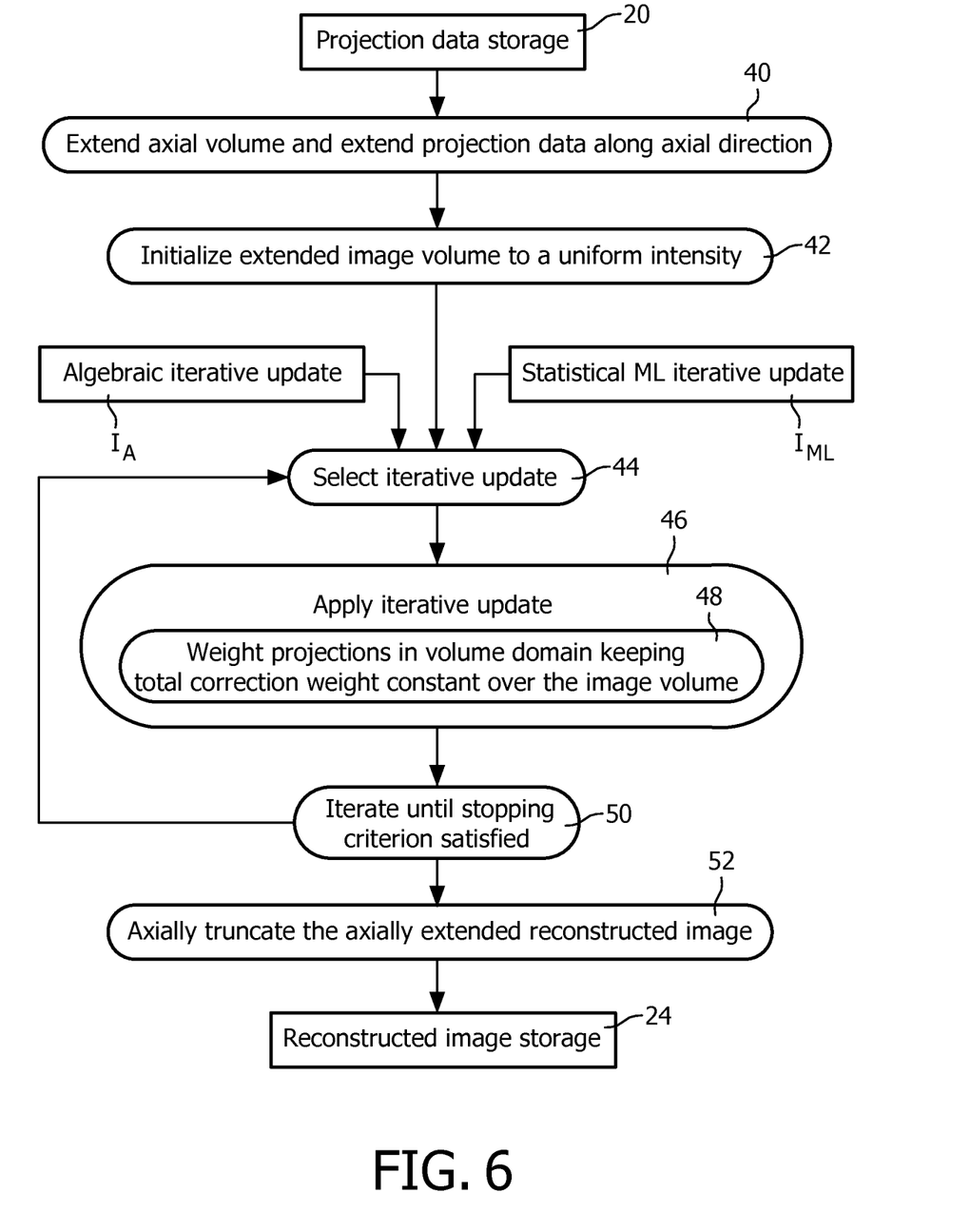
FIG. 6 diagrammatically shows operation of the iterative reconstruction module of FIG. 1, including invocation of the axial volume extension and volume domain redundancy weighting modules of FIG. 1.

With continuing reference to FIG. 1 and with further reference to FIG. 6, operation of the optional iterative reconstruction module 34 is described in additional detail. FIG. 6 diagrammatically shows operation of the iterative reconstruction module 34 including invocation of the axial volume extension module 30 and the volume domain redundancy weighting module 32. The iterative reconstruction operates on measured cone beam x-ray projection data set Pm stored in the projection data storage 20. In an optional operation 40, the axial volume extension module 30 is invoked to extend the axial volume and extend the projection data along the axial direction as described herein with reference to FIGS. 2-4. In an operation 42, the (extended) image volume is initialized to a uniform (i.e., constant) intensity.

The iterative reconstruction follows. An iterative update is selected in an operation 44, the selected iterative update is applied in an operation 46, and an operation 50 transfers process flow back to the selection operation 44 until a stopping criterion is met. The iterative update operation 46 includes a weighting operation 48 in which the volume domain redundancy weighting module 32 is invoked to perform weighting in the volume domain as described herein with reference to FIG. 5. Alternatively, weighting in the projection domain, for example in accordance with a Feldkamp-type algorithm that applies weighting to the projection data such that a backprojection of all weighting functions would result in a uniform image, may be employed.

Assuming that the reconstruction volume was axially extended as per operation 40, the final reconstructed image computed by the iterative reconstruction is axially truncated back to the desired reconstruction extent in an operation 52 to generate the final reconstructed image, which is stored in the reconstructed image storage 24. (If the operation 40 is omitted then the operation 52 is also omitted, and the output of the iterative reconstruction is suitably stored in the reconstructed image storage 24).

In executing the iterative reconstruction method of FIG. 6, the iterative update selection operation 44 is employed to perform the iterative reconstruction including one or more iterations employing one kind of iterative update, preferably a relatively faster converging iterative update, such as an illustrative algebraic iterative update $I_A$, followed by one or more iterations employing a different iterative update, possibly exhibiting slower convergence but better reconstruction properties, such as an illustrative statistical maximum likelihood (ML) iterative update $I_{ML}$. For example, the illustrative statistical ML iterative update $I_{ML}$ is relatively slower than the illustrative algebraic iterative update $I_A$; however, the statistical ML iterative update $I_{ML}$ provides lower reconstruction noise as compared with the algebraic iterative update $I_A$. Thus, the one or more first iterations employing the algebraic iterative update $I_A$ operate on the initial uniform or constant volume generated by the initialization operation 42 in order to rapidly generate an initial image that is "close" to the final reconstructed image. This initial image then serves as the initial image for the one or more subsequent iterations employing the statistical ML iterative update $I_{ML}$.

This approach is motivated by the following observations made herein. Iterative reconstruction generally converges more rapidly when the initialization of the image volume prior to reconstruction is close to the "correct" (or final) reconstruction result. Statistical maximum likelihood reconstruction approaches typically have relatively slow convergence and are facilitated by having a good initial value for the initial reconstruction volume. However, maximum likelihood approaches advantageously can deliver lower reconstruction noise. To provide the desired "close" initial image volume, it is known to employ a filtered-backprojection reconstruction to provide the initial image. However, this initialization approach introduces precisely the type of image artifacts in the volume initialization which motivate selection of iterative reconstruction instead of filtered backprojection reconstruction. In other words, the usual reason why the skilled artisan selects iterative reconstruction rather than a filtered-backprojection reconstruction is to avoid the types of image artifacts that can be introduced by filtered-backprojection. But, if a filtered-backprojection reconstruction is used as the initial image, then the subsequent iterative reconstruction may be ineffective at removing these undesirable image artifacts introduced by the filtered backprojection, even when using an iterative update such as statistical maximum likelihood.

By contrast, the disclosed combination of initializing to a constant or uniform image followed by one or more iterations employing one kind of iterative update, possibly a relatively faster converging iterative update, (the algebraic iterative update $I_A$ in the illustrative example) followed by one or more iterations employing a different iterative update, possibly a relatively slower converging iterative update, (the statistical ML iterative update $I_{ML}$ in the illustrative example) provides efficient convergence to a final reconstructed image of high resolution and low noise, without introducing artifacts of the type typically generated by filtered-backprojection. Thus, one embodiment of the disclosed approach is a "hybrid" reconstruction: After initializing the volume to a constant value (e.g., to zero), one or a few iterations of a first iterative algorithm that is selected to provide fast convergence, such as an algebraic technique, are used to generate a first image estimate. Then, further iterations are performed with a different (second) algorithm, such as a statistical maximum-likelihood algorithm. This way, a good volume initialization is obtained while avoiding introducing image artifacts in the initialization, and this is followed by subsequent use of a different algorithm that is optimized for low-noise or another objective. Although in the illustrative embodiment the first iterative algorithm is chosen at least in part for its fast convergence properties, other criteria can be employed, such as robustness.

The point at which the selection operation 44 switches from the algebraic iterative update $I_A$ to the statistical ML update $I_{ML}$ can be chosen in various ways. In one approach, a fixed number of (e.g., one, or two, or three) iterations are performed using the relatively faster converging iterative update before switching over to the relatively slower converging update. In a another approach, an iteration-to-iteration figure of merit can be monitored by the selection operation 44 to decide when to switch to the relatively slower converging update. For example, the selection operation 44 may monitor the error metric respective to the measured (and optionally extended) projection data set and make the switch when the iteration-to-iteration change in this error metric is below a selected threshold value.

The iterative reconstruction of FIG. 6 is disclosed with illustrative reference to off-center geometries. However, the iterative reconstruction of FIG. 6 is also suitably applied in reconstructing CT imaging data acquired by a cone beam CT imaging system having a symmetric geometry in which the two-dimensional detector is positioned symmetrically in the rotational (i.e., fan) direction with respect to the central x-ray passing through the isocenter.

Figure 7:
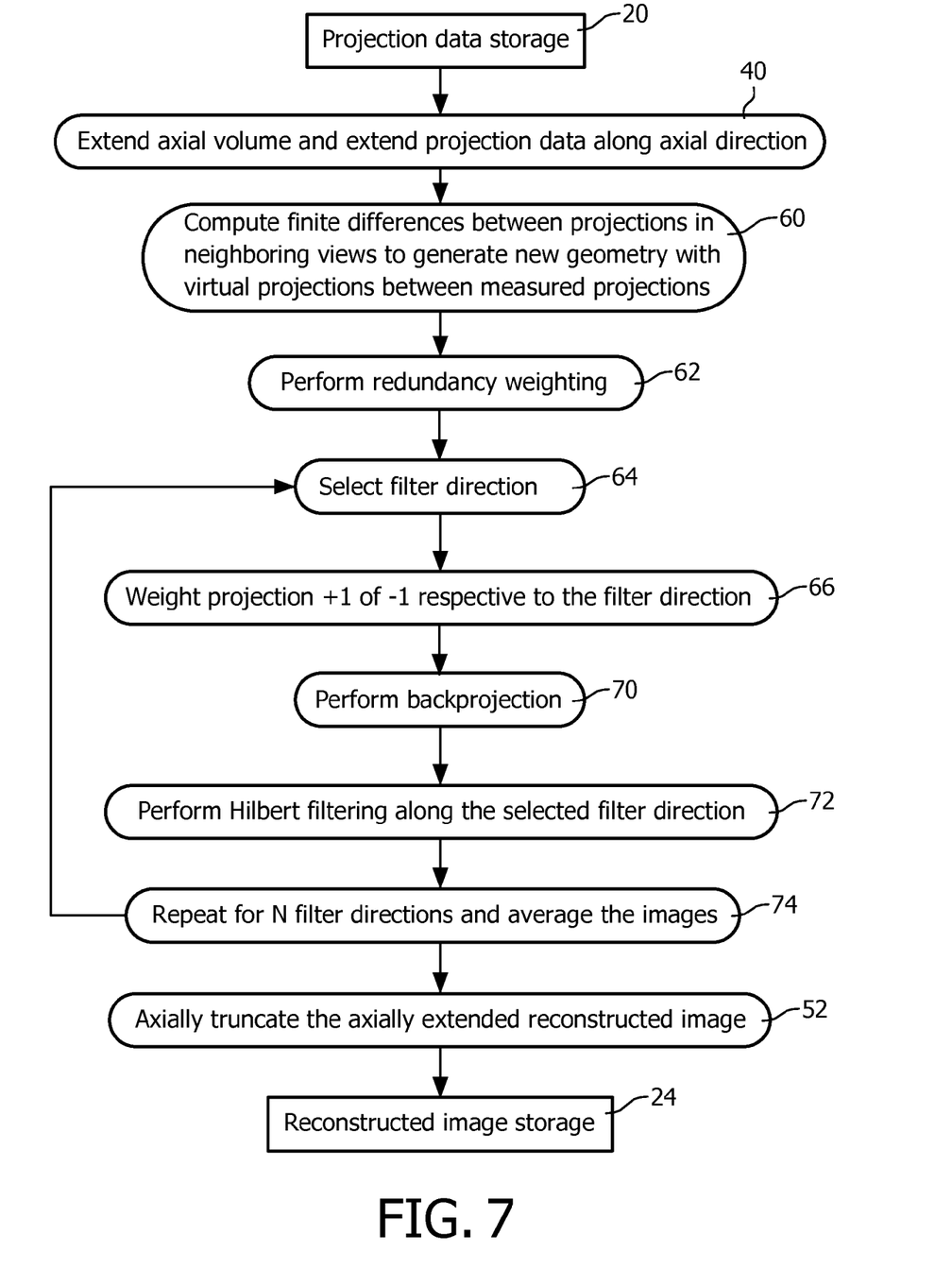
FIG. 7 diagrammatically shows operation of the backprojection filtration (BPF) reconstruction module of FIG. 1, including optional invocation of the axial volume extension module of FIG. 1.
Figure 8:
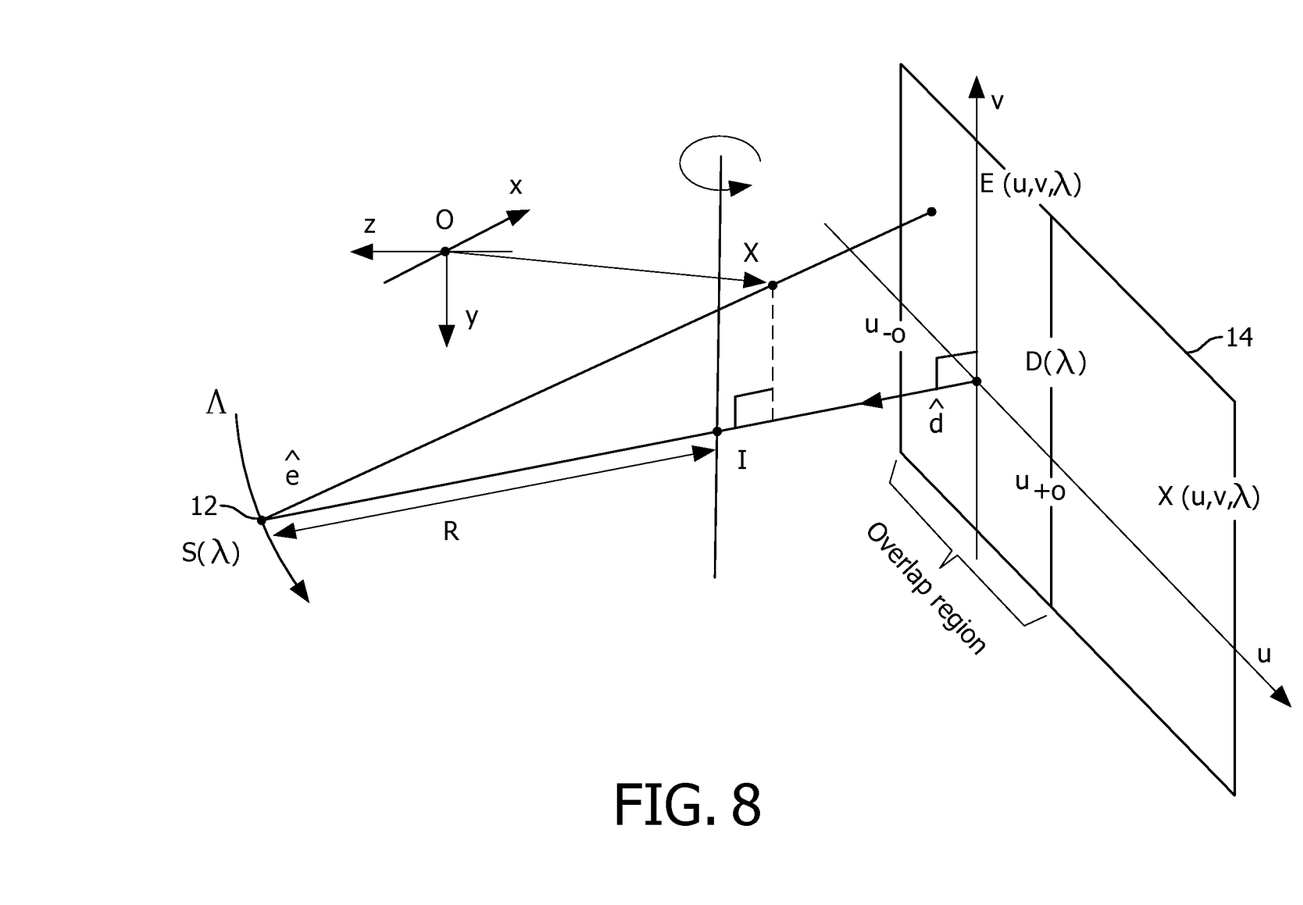
FIG. 8 diagrammatically shows notation used in the mathematical description set forth herein of operation of the back-projection filtration (BPF) reconstruction module of FIG. 1.

With continuing reference to FIG. 1 and with further reference to FIGS. 7 and 8, operation of the optional backprojection filtration (BPF) reconstruction module 36 is described in additional detail. FIG. 7 diagrammatically shows operation of the BPF reconstruction module 36 including invocation of the optional axial volume extension module 30. The reconstruction operates on measured cone beam x-ray projection data set Pm stored in the projection data storage 20. In the optional operation 40 already described with reference to FIG. 6, the optional axial volume extension module 30 is invoked to extend the axial volume and extend the projection data along the axial direction as described herein with reference to FIGS. 2-4. The BPF reconstruction algorithm is next implemented by operations 60, 62, 64, 66, 70, 72, 74 to generate the (extended) reconstructed image. Assuming that the reconstruction volume was axially extended as per operation 40, the final reconstructed image computed by the BPF reconstruction is axially truncated in the operation 52 (already described with reference to FIG. 6) to generate the final reconstructed image, which is stored in the reconstructed image storage 24. (If the operation 40 is omitted then the operation 52 is also omitted, and the output of the BPF reconstruction operations 60, 62, 64, 66, 70, 72, 74 is suitably stored in the reconstructed image storage 24).

The BPF performed by the operations 60, 62, 64, 66, 70, 72, 74 is as follows. In the operation 60, Katsevich-type differentiation is performed in which finite differences are computed between neighboring projections to generate a new geometry with virtual projections between the measured projections. A higher order differentiation including e.g. three projections could also be used, potentially leaving the new geometry exactly at the location of the old one. This is followed by the operation 62 which performs redundancy weighting. In the embodiment of FIG. 7 the redundancy weighting operation 62 is performed in the projection domain, as is done by way of example in filtered backprojection. Alternatively, the operation 62 could be replaced by volume domain redundancy weighting performed by invoking the optional volume domain redundancy weighting module 32. The backprojection filtration is then performed by the operations 64, 66, 70, 72, 74. In the disclosed approach, averaging over a plurality of different directions for the Hilbert filtering is employed to mitigate streak artifacts along the Hilbert filter lines in the reconstructed volume. Such streak artifacts have heretofore been typically present in images generated by circular BPF algorithms. The backprojection filtration includes: the operation 64 which defines a set of parallel lines for the Hilbert filtering that fill up the volume and have a selected filter direction; the operation 66 weights the projection rays with +1 or −1 corresponding to the direction relative to the parallel line direction; the operation 70 which performs the backprojection onto the set of parallel lines filling up the volume; the operation 72 which performs inverse finite Hilbert filtering on the lines in the volume; and the operation 74 which repeats the steps operations 64, 66, 70, 72 for a plurality of different directions for the Hilbert filtering to generate a plurality of "intermediate" images that are averaged to generate the final reconstructed image.

Thus, the BPF reconstruction module 36 transforms the measured cone beam x-ray projection data set Pm to a new geometry including finite differences between projections of one or more neighboring projection views (as per operation 60), and performs backprojection filtration reconstruction on the measured (and optionally axially extended) cone beam x-ray projection data set transformed to the new geometry. If suppression of streak artifacts is desired, then the repetition operation 74 is performed, and the averaging over a plurality of different directions for the Hilbert filtering mitigates streak artifacts along the Hilbert filter lines in the reconstructed volume. Without loss of generality, the optional repetition operation 74 is assumed to perform N repetitions. The N different directions for the N repetitions are selected to maximize streak suppression, and can be regularly or irregularly spaced in angular direction. In one suitable embodiment, N is between 3 and 5, and the N different directions are spaced apart in angle by 5° steps. In some embodiments, N is equal to or less than six and the N different directions have angular differences of 30° or less.

The reconstruction of FIG. 7 is disclosed with illustrative reference to off-center geometries. However, the reconstruction of FIG. 7 is also suitably applied in reconstructing CT imaging data acquired by a cone beam CT imaging system having a symmetric geometry in which the two-dimensional detector is positioned symmetrically in the rotational (i.e., fan) direction with respect to the central x-ray passing through the isocenter.

With reference to FIG. 7 and with further reference to FIG. 8, a more detailed embodiment is described with specific reference to an off-center geometry described using the notation set forth in FIG. 8. The planar detector 14 and the x-ray source 12 are rotated around the y-axis. The distance between source 12 and detector 14 is denoted as D. The distance from the source 12 to the rotation axis is denoted R (which is to be distinguished from the radius R of FIG. 1), and I denotes the iso-center of the imaging system (corresponding to the iso-center ISO of FIG. 1). The circular orbit is parameterized by the path length $\lambda \in \Lambda = [0, 2\pi R)$. The projected iso-center on the detector is located at $D(\lambda)$ and defines the origin of the detector system. The detector v-axis is parallel to the rotational axis. Accordingly, the u-axis is parallel to the trajectory tangent vector with $u_{min} \leq u \leq u_{max}$. The cone beam projection data denoted $X(u,v,\lambda)$ is given by:

$$X(u, v, \lambda) = \int_0^\infty f(S(\lambda) + l\hat{e}(u, v, \lambda))dl, \quad (1)$$

where $\hat{e}(u,v,\lambda)$ is the unit vector from the source position $S(\lambda)$ to the detector element $E(u,v,\lambda)$. The corresponding length is denoted by $\overline{SE}$. The flat detector is positioned in off-center geometry. The overlap region $O(\lambda) = \{(u,v) \in \Re^2 | u_{-o} \leq u \leq u_{+o}, v_{min} \leq v \leq v_{max}\}$ is defined as the symmetric region around $D(\lambda)$ with measured projection values $X(u,v,\lambda)$. The overlap region $O(\lambda)$ corresponds to the overlap region $R_{overlap}$ of FIG. 5. The width of the overlap region $O(\lambda)$ is $\Delta u = u_{+o} - u_{-o}$. The differentiation operation 60 in this illustrative embodiment employs a Katsevich-type derivative defined by:

$$X^{KD}(u, v, \lambda) = \left(\frac{\partial X}{\partial \lambda} + \frac{\partial X}{\partial u}\frac{\partial u}{\partial \lambda} + \frac{\partial X}{\partial v}\frac{\partial v}{\partial \lambda}\right). \quad (2)$$

In this illustrative embodiment, the redundancy weighting operation 62 employs the following weighting function:

$$w(u) = \begin{cases} 0, & u_{min} \leq u \leq u_{-o} \\ \sin^2\left(\frac{\pi}{2}\frac{u - u_{-o}}{\Delta u}\right) & u_{-o} \leq u \leq u_{+o} \\ 1, & u_{+o} \leq u \leq u_{max}. \end{cases} \quad (3)$$

The filter direction selection operation 64 suitably selects the filtering direction, denoted $\hat{m}$, and $x(t,s,\hat{m}) = s + t\hat{m}$ is a parameterization of the points on a line through a point s, with $t \in (-\infty, \infty)$. Then the directional weighting operation 66 is suitably implemented as:

$$w_{sig}(\hat{m}, u, \lambda) = \begin{cases} +1 & \text{if } 0 \leq (acos(\hat{m} \cdot S(\lambda)) - (atan(u/D(\lambda))) < \pi \\ -1 & \text{else}. \end{cases} \quad (4)$$

The differentiated backprojection operation 70 applied to the Katsevich-type differentiated projections $X^{KD}$ onto a set of parallel lines $L(t,s,\hat{m})$ of the form $x(t,s,\hat{m}) = s + t\hat{m}$ is given by:

$$b^{KD}(x(t, s, \hat{m}), \lambda_1, \lambda_2) = \int_{\lambda_1}^{\lambda_2} \frac{w(u) \cdot w_{sig}(\hat{m}, u, \lambda)}{|x - S(\lambda)|} X^{KD}(u, v, \lambda)(1/R) d\lambda. \quad (5)$$

The Hilbert filtering operation 72 is implemented in this illustrative embodiment as follows. The differentiated backprojection for a non-truncated full scan or minimum data schemes is equivalent to the Hilbert transform $H_{\hat{m}}[f(x)]$ of the object function along a set of lines $L(t,s,\hat{m})$.

$$H[f](x(t, s, \hat{m})) = \int_{-\infty}^\infty \frac{1}{\pi(t - t')} f(x(t, s, \hat{m})) dt' \quad (6)$$
$$= \frac{1}{2\pi^2} b(x(t, s, \hat{m}), \lambda_1, \lambda_2).$$

The differentiated backprojection $b^{KD}$ is known along the line $L(t,s,\hat{m})$ within an interval $[t_{L2}, t_{U2}]$ that is slightly larger than the support $\Omega$ of $f$, such that the following condition holds:

$$t_{L2} < t_{L1} < t_{min} < t_{max} < t_{U1} < t_{U2} \quad (7).$$

Then the object $f$ is recovered by computing the finite inverse Hilbert Transform $\overline{H}$:

$$f(x(t, s, \hat{m})) = \frac{1}{2\pi}\overline{H}[b] \quad (8)$$
$$= \frac{1}{2\pi[k(t, t_{L2}, t_{U2}) - k(t, t_{L1}, t_{U1})]} \times$$
$$\int_{t_{L2}}^{t_{U2}} \frac{dt'}{t' - t}[k(t', t_{L2}, t_{U2}) - k(t', t_{L1}, t_{U1})] \times$$
$$b^{KD}(x(t', s, \hat{m}), \lambda_1, \lambda_2),$$

with:

$$k(t, t_L, t_U) = \begin{cases} \sqrt{(t - t_L)(t_U - t)} & \text{if } t_L < t < t_U \\ 0 & \text{else}. \end{cases} \quad (9)$$

If the repeat/average operation 52 is omitted, then the resulting reconstruction may suffer from substantial streak artifacts along the filter line direction in regions of sharp intensity transitions. By including the repeat/average operation 52 to reconstruct the same object N times along different filter directions $\hat{m}$ and average the results, streak artifacts are substantially suppressed or eliminated. The repeat/average operation 52 is suitably represented mathematically in this example as:

$$f_N(x) = \frac{1}{N}\sum_{i=1}^N f_i(x(t, s, \hat{m}_i)). \quad (10)$$

The object function is suitably resampled at the final grid positions using tri-linear interpolation to generate the final reconstructed image.

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

The invention claimed is:

1. A computed tomography (CT) reconstruction method comprising:

reconstructing an axially extended reconstructed image from a measured cone beam x-ray projection data set acquired during rotation of an x-ray source in a rotation plane around an axial axis, the reconstructing being performed for an extended volume comprising (i) a reconstructable volume of the measured cone beam x-ray data set within which each voxel is probed by projections of the measured cone beam x-ray projection data set over at least 180° and (ii) an additional volume extending beyond the reconstructable volume along the axial direction; and generating a reconstructed image by axial truncation of the axially extended reconstructed image.

2. The CT reconstruction method as set forth in claim 1, wherein the extended volume includes at least a total volume in which the cone beam x-ray data set may have undergone absorption.

3. The CT reconstruction method as set forth in claim 2, wherein the reconstructing comprises:
reconstructing the axially extended reconstructed image from an extended projection data set that includes the measured cone beam x-ray projection data set and an additional projection data set comprising projections that are not in the measured cone beam x-ray projection data set and that intersect the total volume in which the measured cone beam x-ray data set may have undergone absorption.

4. The CT reconstruction method as set forth in claim 3, wherein the extended volume comprises the reconstructable volume of the extended projection data set.

5. The CT reconstruction method as set forth in claim 2, wherein the extended volume comprises a reconstructable volume of an extended projection data set that includes all projections intersecting a total volume in which the measured cone beam x-ray data set may have undergone absorption.

6. The CT reconstruction method as set forth in claim 3, wherein the extended projection data set is formed by extending the measured cone beam x-ray data set by extrapolating values of projections of the measured cone beam x-ray data set.

7. The CT reconstruction method as set forth in claim 1, wherein the measured cone beam x-ray data set comprises an off-center geometry measured cone beam x-ray data set.

8. The CT reconstruction method as set forth in claim 1, wherein the reconstructing comprises:
weighting the volume correction during the iterative update step in the volume domain with normalization of the weighting such that the total correction weight is constant over the reconstruction volume.

9. The CT reconstruction method as set forth in claim 1, wherein the reconstructing comprises:
performing iterative reconstruction including one or more iterations employing a first converging iterative update followed by one or more iterations employing a second converging iterative update different from the first converging iterative update.

10. The CT reconstruction method as set forth in claim 1, wherein the reconstructing comprises:
performing a backprojection filtration (BPF) reconstruction.

11. The CT reconstruction method as set forth in claim 10, wherein the performing the BPF reconstruction comprises:
transforming the measured cone beam x-ray projection data set to a new geometry including finite differences between projections of neighboring projection views.

12. A computed tomography (CT) reconstruction method comprising:
generating a reconstructed image by reconstructing a measured cone beam x-ray projection data set acquired during rotation of an x-ray source in a rotation plane around an axial axis, the reconstructing including:
(0) initializing an initial reconstructed image;
(1) performing iterative reconstruction including one or more iterations employing one type of iterative update wherein the first iteration operates on the initial reconstructed image and wherein the iterative reconstruction (1) generates a reconstructed image estimate; and
(2) performing iterative reconstruction including one or more iterations employing a different type of iterative update wherein the first iteration operates on the reconstructed image estimate.

13. The CT reconstruction method as set forth in claim 12, wherein the iterative reconstruction (1) employs an algebraic iterative update and the iterative reconstruction (2) employs a statistical maximum likelihood iterative update.

14. The CT reconstruction method as set forth in claim 12, wherein the initializing (0) comprises:
initializing all voxels of the initial reconstructed image to a constant value.

15. The CT reconstruction method as set forth in claim 12, wherein the generating a reconstructed image further comprises:
weighting the volume correction during the iterative update in the volume domain with normalization of the weighting such that the total correction weight is constant over the reconstruction volume.

16. The CT reconstruction method as set forth in claim 12, wherein the generating a reconstructed image further comprises:
generating the reconstructed image having a volume comprising a reconstructable volume of an extended projection data set that includes all projections intersecting a total volume in which the measured cone beam x-ray data set may have undergone absorption.

17. The CT reconstruction method as set forth in claim 12, wherein the measured cone beam x-ray data set comprises an off-center geometry measured cone beam x-ray data set.

18. A computed tomography (CT) reconstruction method comprising:
generating a reconstructed image by reconstructing a measured cone beam x-ray projection data set acquired during rotation of an x-ray source in a rotation plane around an axial axis, the reconstructing including:
transforming the measured cone beam x-ray projection data set to a new geometry including finite differences between projections of neighboring projection views; and
performing backprojection filtration (BPF) reconstruction on the measured cone beam x-ray projection data set transformed to the new geometry including the finite differences between projections of neighboring projection views using Hilbert filtering along six or fewer different directions having angular differences of 30° or less to generate a corresponding six or fewer intermediate reconstructed images and averaging the six or fewer intermediate reconstructed images to generate the reconstructed image.

19. The CT reconstruction method as set forth in claim 18, wherein the measured cone beam x-ray data set comprises an off-center geometry measured cone beam x-ray data set.

20. The CT reconstruction method as set forth in claim 1, further comprising displaying the reconstructed image.

21. A processor configured to perform a computed tomography (CT) reconstruction method as set forth in claim 1.

22. A storage medium storing instructions executable on a digital processor to perform a computed tomography (CT) reconstruction method as set forth in claim 1.

* * * * *